US008705842B2

(12) United States Patent
Lee et al.

(10) Patent No.: US 8,705,842 B2
(45) Date of Patent: Apr. 22, 2014

(54) ROBOT CLEANER AND CONTROLLING METHOD OF THE SAME

(75) Inventors: Tae-Kyeong Lee, Pohang (KR); Seongsu Lee, Seoul (KR); Seungmin Baek, Seoul (KR); Sangik Na, Seoul (KR); Se-Young Oh, Pohang (KR); Sanghoon Baek, Pohang (KR); Kwangro Joo, Pohang (KR); Jeongsuk Yoon, Seoul (KR); Yiebin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 13/281,608

(22) Filed: Oct. 26, 2011

(65) Prior Publication Data

US 2012/0106829 A1 May 3, 2012

(30) Foreign Application Priority Data

Nov. 3, 2010 (KR) .................. 10-2010-0108850

(51) Int. Cl.
*G06K 9/00* (2006.01)

(52) U.S. Cl.
USPC ........... 382/153; 700/259; 700/258; 700/245; 701/300; 701/25; 701/533; 901/46

(58) Field of Classification Search
USPC ............. 382/153; 901/46; 700/259, 245, 258; 701/300, 25, 533
See application file for complete search history.

(56) References Cited

U.S. PATENT DOCUMENTS

| 6,255,793 | B1 * | 7/2001 | Peless et al. ................. 318/580 |
| 8,290,238 | B2 * | 10/2012 | Silver ............................ 382/141 |
| 2002/0015521 | A1 * | 2/2002 | Kim .............................. 382/153 |
| 2002/0153184 | A1 * | 10/2002 | Song et al. .................... 180/167 |
| 2004/0128031 | A1 * | 7/2004 | Wang, II ....................... 700/258 |
| 2005/0010331 | A1 * | 1/2005 | Taylor et al. ................. 700/245 |
| 2005/0171644 | A1 * | 8/2005 | Tani .............................. 700/253 |

(Continued)

FOREIGN PATENT DOCUMENTS

| JP | 05-046239 | 2/1993 |
| JP | 2005-339408 | 12/2005 |
| JP | 2009-165823 | 7/2009 |
| JP | 2010-112836 | 5/2010 |

OTHER PUBLICATIONS

Young-Ho Choi • Tae-Kyeong Lee • Se-Young Oh, "A line feature based SLAM with low grade range sensors using geometric constraints and active exploration for mobile robot", Springer Science media, 2007.*

(Continued)

*Primary Examiner* — Stephen R Koziol
*Assistant Examiner* — Shaghayegh Azima
(74) *Attorney, Agent, or Firm* — KED & Associates, LLP (57) ABSTRACT

A robot cleaner and a method for controlling the same are provided. A region to be cleaned may be divided into a plurality of sectors based on detection data collected by a detecting device, and a partial map for each sector may be generated. A full map of the cleaning region may then be generated based on a position of a partial map with respect to each sector, and a topological relationship between the partial maps. Based on the full map, the robot cleaner may recognize its position, allowing the entire region to be completely cleaned, and allowing the robot cleaner to rapidly move to sectors that have not yet been cleaned.

15 Claims, 12 Drawing Sheets

(56) References Cited

U.S. PATENT DOCUMENTS

| | | | |
|---|---|---|---|
| 2006/0237158 A1* | 10/2006 | Shim et al. | 164/18 |
| 2006/0260087 A1* | 11/2006 | Im et al. | 15/319 |
| 2008/0243388 A1* | 10/2008 | Eguchi et al. | 701/301 |
| 2008/0249661 A1* | 10/2008 | Hong et al. | 700/252 |
| 2008/0273791 A1* | 11/2008 | Lee et al. | 382/153 |
| 2008/0294338 A1* | 11/2008 | Doh et al. | 701/209 |
| 2009/0055020 A1* | 2/2009 | Jeong et al. | 700/251 |
| 2009/0093984 A1* | 4/2009 | Choi et al. | 702/104 |
| 2009/0125175 A1* | 5/2009 | Park et al. | 701/28 |
| 2010/0211244 A1* | 8/2010 | Jeong et al. | 701/25 |
| 2010/0263142 A1* | 10/2010 | Jones et al. | 15/21.1 |
| 2010/0305752 A1* | 12/2010 | Abramson | 700/245 |
| 2011/0118928 A1* | 5/2011 | Yoo et al. | 701/26 |
| 2011/0125324 A1* | 5/2011 | Baek et al. | 700/258 |
| 2011/0178709 A1* | 7/2011 | Park et al. | 701/300 |
| 2011/0211731 A1* | 9/2011 | Lee et al. | 382/106 |
| 2012/0051595 A1* | 3/2012 | Lee et al. | 382/103 |
| 2012/0109376 A1* | 5/2012 | Lee et al. | 700/259 |
| 2012/0121161 A1* | 5/2012 | Eade et al. | 382/153 |
| 2012/0227210 A1* | 9/2012 | Kim et al. | 15/347 |
| 2013/0073088 A1* | 3/2013 | Lee et al. | 700/259 |

OTHER PUBLICATIONS

Japanese Office Action issued in JP Application No. 2011-229841 dated Nov. 26, 2012.

* cited by examiner

ROBOT CLEANER AND CONTROLLING METHOD OF THE SAME

CROSS-REFERENCE TO RELATED APPLICATION(S)

This application claims priority under 35 U.S.C. §119 to Korean Application No. 10-2010-0108850 filed in Korea on Nov. 3, 2010, whose entire disclosure(s) is/are hereby incorporated by reference.

BACKGROUND

1. Field

This relates to a robot cleaner and a controlling method of the same.

2. Background

Generally, robots have been developed for an industrial use, and some parts of factory automation. Such robots may be applied to various fields such as, for example, medical robots, space robots, home robots, etc. are being developed.

A representative home robot may be a robot cleaner, a kind of home electronic appliance capable of performing a cleaning operation by sucking in dust or foreign materials while autonomously moving within a predetermined region. Such a robot cleaner may include a chargeable battery and an obstacle sensor for avoiding obstacles while moving.

BRIEF DESCRIPTION OF THE DRAWINGS

The embodiments will be described in detail with reference to the following drawings in which like reference numerals refer to like elements wherein.

DETAILED DESCRIPTION

Description will now be given in detail of exemplary embodiments with reference to the accompanying drawings. For the sake of brief description with reference to the drawings, the same or equivalent components will be provided with the same reference numbers, and description thereof will not be repeated.

Figure 1:
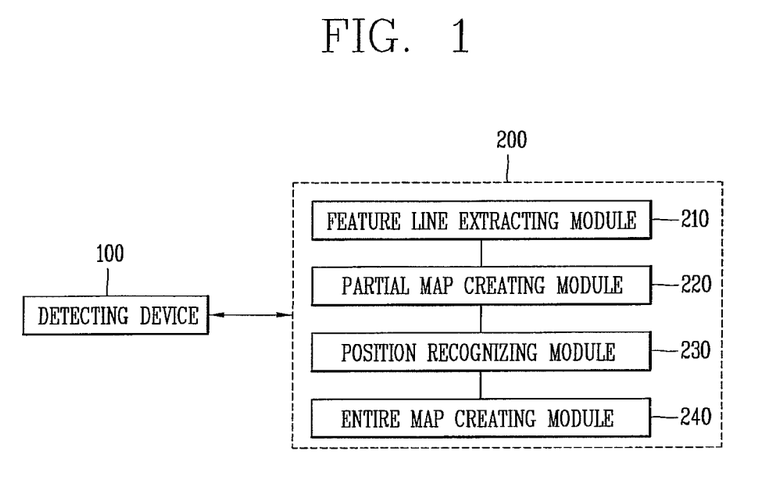
FIGS. 1 and 2 are block diagrams of a robot cleaner as embodied and broadly described herein.
Figure 3:
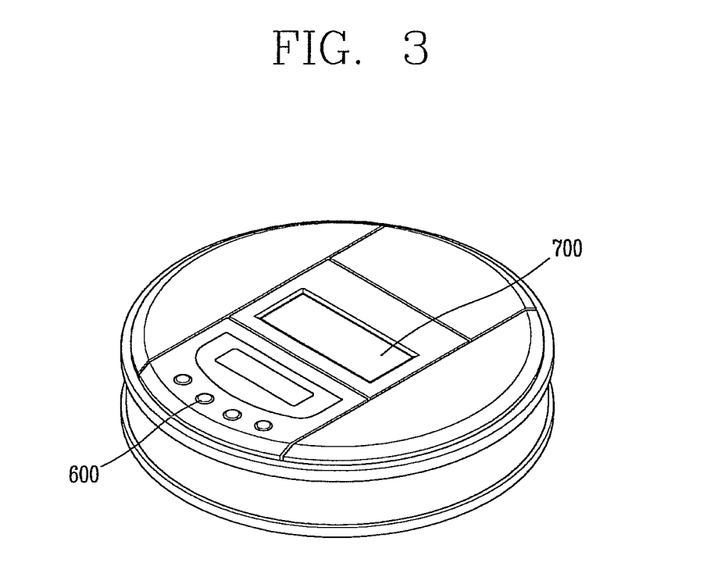
FIG. 3 is a perspective view of a robot cleaner as embodied and broadly described herein.

Referring to FIGS. 1 and 3, a robot cleaner according to one embodiment as broadly described herein may be configured to perform a cleaning operation by dividing an entire region into one or more sectors. The robot cleaner may include one or more detecting devices 100 and a controller 200. The one or more detecting devices 100 are configured to detect objects inside the sectors, and to output detection data. The controller 200 is configured to create a partial map with respect to each sector based on the detection data, and to create an entire map with respect to an entire region based on a relative position between the partial maps.

The controller 200 divides the entire region into one or more sectors having a predetermined size, and performs an initialization process for creating partial maps. Then, the controller 200 controls the robot cleaner to move along an outer peripheral surface of each sector. While the robot cleaner moves along the outer peripheral surface of the sector, the detecting device 100 detects an object. The object may be a wall surface, an obstacle, and so on. An inexpensive sensor such as an infrared ray sensor or a supersonic sensor may be used as the detecting device 100, rather than an expensive sensor such as a camera or a laser sensor. The controller 200 completes the partial map based on the detection of objects sensed by the detecting device 100. And, the controller 200 creates an entire map based on a topological relation between the sectors. More specifically, the controller 200 creates a topological map using a relative position between the sectors, i.e., a topological relation, and creates an entire map based on the topological map.

Referring to FIG. 1, the controller 200 includes a feature line extracting module 210 configured to extract one or more feature lines based on the detection data, and a partial map creating module 220 configured to create partial maps based on the feature lines.

Figure 10:
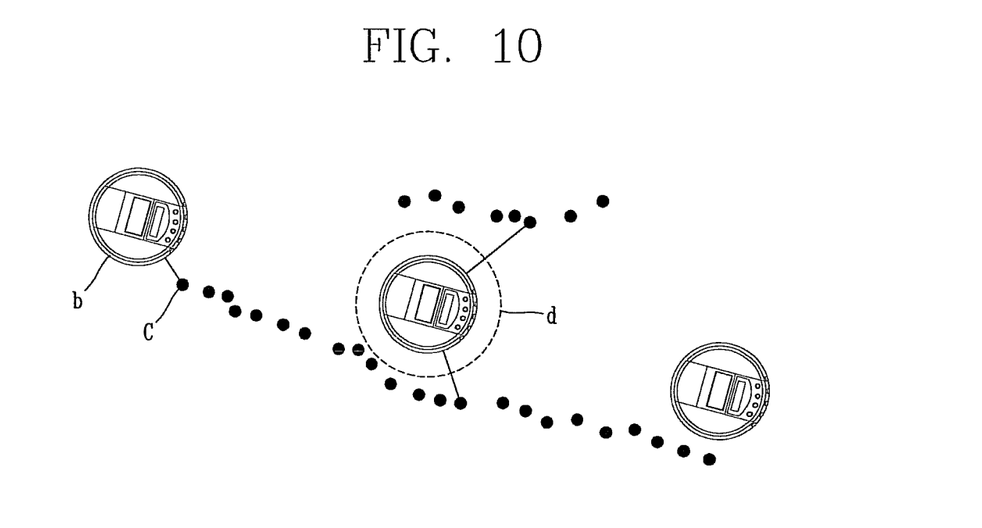
FIGS. 10 and 11 illustrate an operation to extract feature lines.
Figure 11:
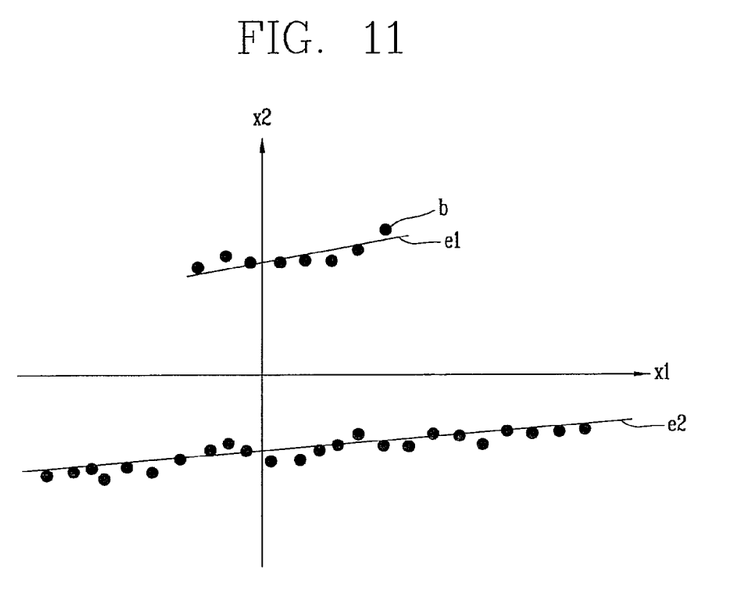

As shown in FIGS. 10 and 11, the feature line extracting module 210 accumulates the detection data sensed by the detecting device 100 for a predetermined period or a specific time point. Then, upon accumulation of a certain amount of detection data, the feature line extracting module 210 extracts a feature line from a plurality of feature points. In particular, the feature line extracting module 210 sets a center point of the feature line. Based on this center point, the feature line extracting module 210 converts the detection data into predetermined coordinate values by using a coordinates conversion method, etc. Then, the feature line extracting module 210 groups feature lines into an appropriate cluster using distances. Then, the feature line extracting module 210 extracts parameters of separate clusters, such as a length of a feature line, a distribution and an error, and calculates a reliability with respect to each cluster. The feature line may be extracted based on, for example, an object position detected by the detecting device 100, or a position of the robot cleaner.

Figure 12:
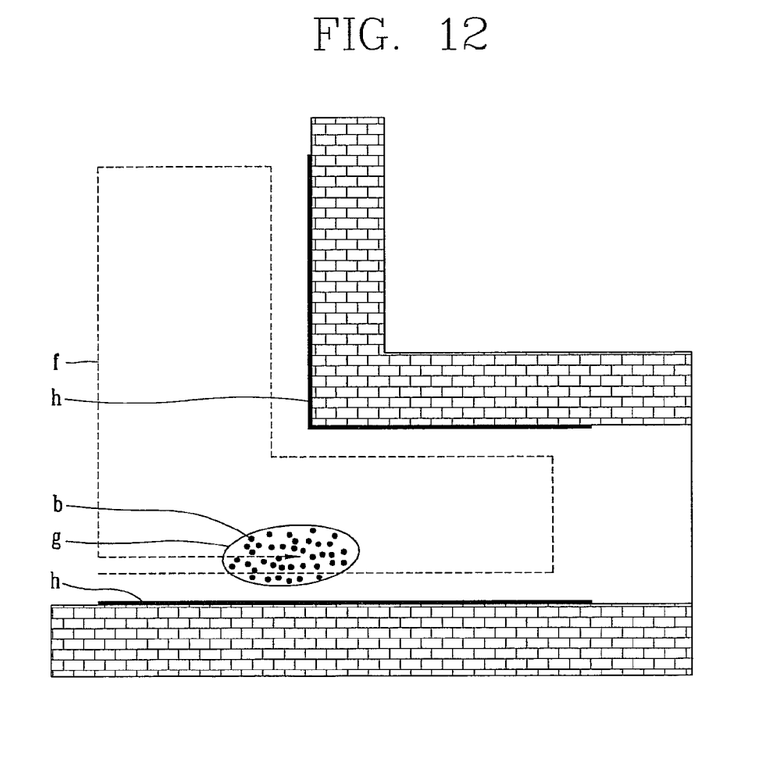
FIG. 12 illustrates an operation to create a partial map using feature lines.
Figure 13:
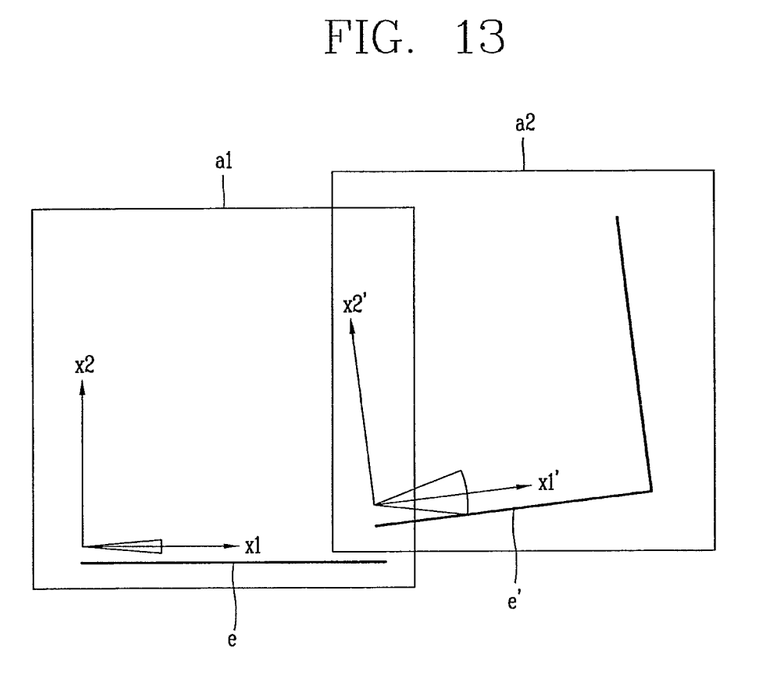
FIGS. 13 to 16 illustrate an operation to compensate for a partial map.
Figure 14:
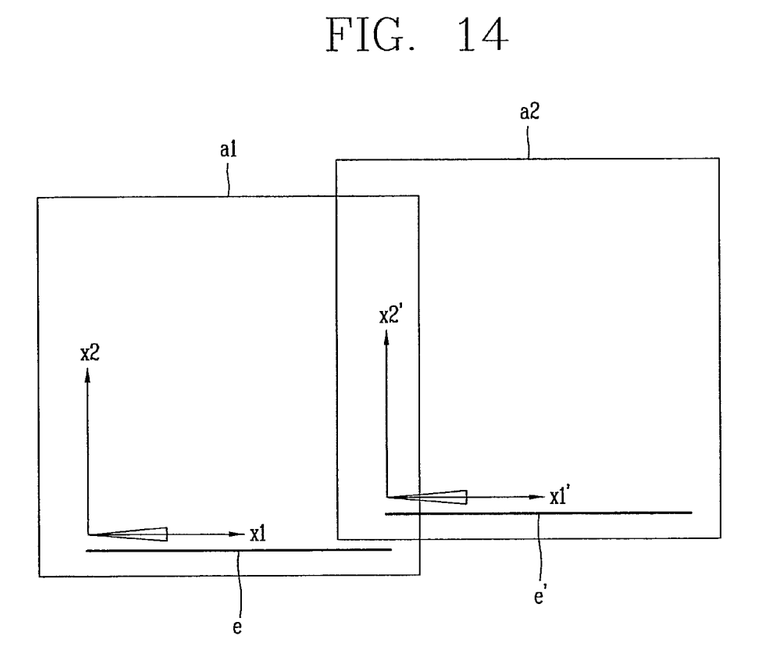
Figure 15:
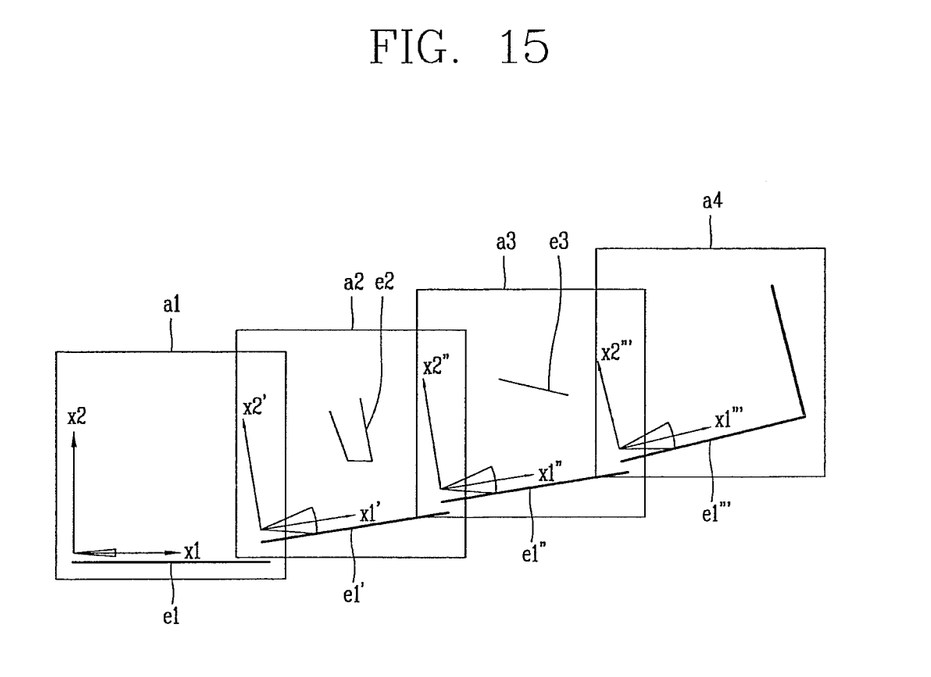
Figure 16:
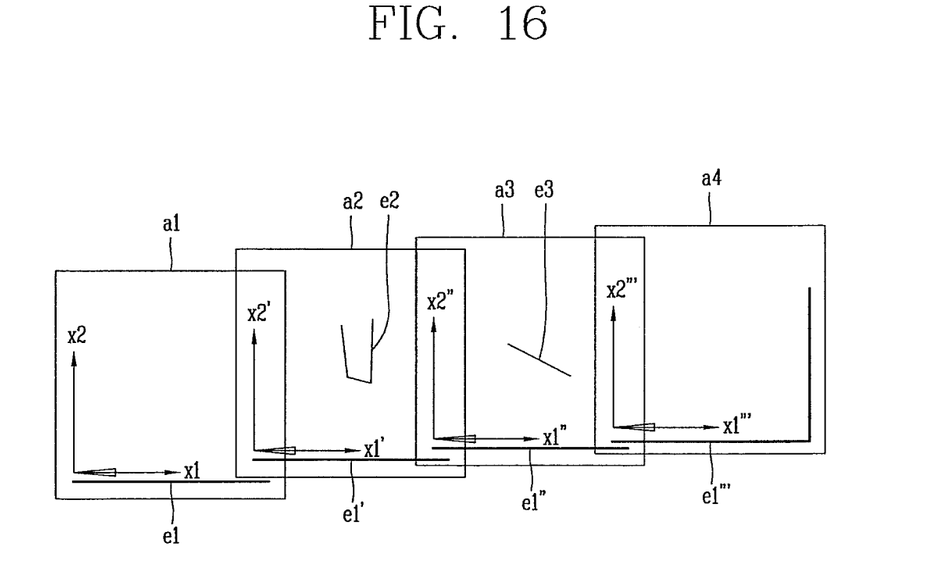

As shown in FIG. 12, when the robot cleaner moves along the outer peripheral surface of the sector, the partial map creating module 220 compares the feature lines with each other, the feature lines extracted by the feature line extracting module 210 based on the detection data. The partial map creating module 220 updates the feature lines according to a result of the comparison, and creates a partial map based on the extracted feature lines. The robot cleaner consecutively detects an object as it moves along the outer peripheral surface of the sector. And, the robot cleaner extracts feature lines based on detection data, and merges similar feature lines together after comparing the feature lines with each other. These processes are repeated until the same feature line is extracted. Through these processes, the partial map creating module 220 creates a partial map.

As shown in FIGS. 13 to 16, the partial map creating module 220 compensates for an orientation (direction) of each sector based on the feature lines, and creates a partial map based on the compensated, or adjusted, sector. Generally, compensation for the orientation of the sector is based on an assumption that a wall surface of each sector is perpendicular to the ground, or floor surface.

Referring to FIG. 1, the controller 200 further includes a position recognizing module 230 configured to recognize a position based on the detection data and the feature lines.

Figure 17:
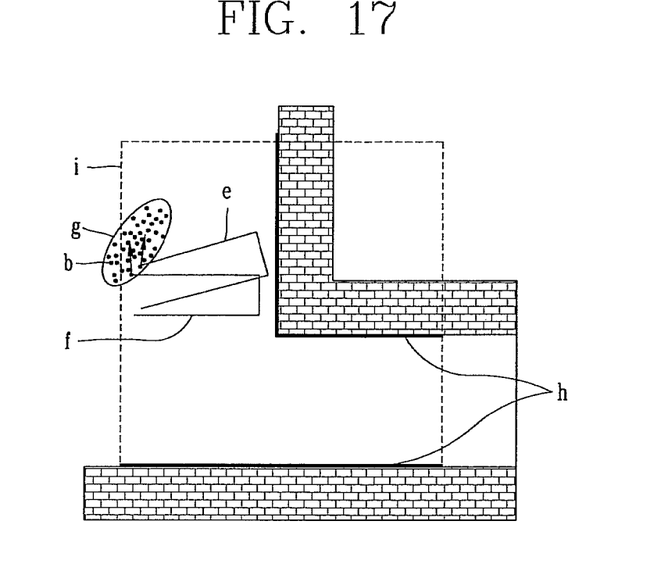
FIG. 17 illustrates an operation to recognize a position of a robot cleaner and to compensate for the position.

The position recognizing module 230 recognizes a position of an object or a position of the robot cleaner based on detection data sensed by the detecting device 100. And, the position recognizing module 230 verifies the position of the object or the position of the robot cleaner by using feature lines extracted based on the detection data. This may allow the position recognizing module 230 to perform precise position recognition. The robot cleaner performs sector compensation assuming that a wall surface of each sector is perpendicular to the ground. And, the robot cleaner cleans the sector using a partial map with respect to the compensated, or adjusted, sector. While the robot cleaner performs a cleaning operation, the position recognizing module 230 compensates for the recognized position by using detection data and feature lines extracted based on the detection data as shown in FIG. 17.

Referring to FIG. 1, the controller 200 further includes an entire map creating module 240. The entire map creating module 240 creates a topological map indicating a position of each sector and a relative position between the sectors. And, the entire map creating module 240 creates an entire map based on the topological map. The entire map creating module 240 matches feature lines inside two sectors, and determines whether the two sectors overlap each other based on a result of the matching. And, the entire map creating module 240 compensates for a topological map by using an error between the two overlapping sectors, and creates an entire map by using the compensated, or adjusted, topological map.

The entire map creating module 240 selects a sector that most overlaps with a current sector, and compares features lines inside the two sectors, thereby calculating position error between two corresponding feature lines. By repeating these processes, the entire map creating module 240 determines whether the sectors overlap each other. The entire map creating module 240 determines whether a closed loop has been formed on a topological map created using the sectors. If a closed loop exists, the entire map creating module 240 compensates for the topological map by reducing a position error between the overlapping sectors. Through these processes, the entire map creating module 240 creates an entire map with respect to an entire region.

Figure 2:
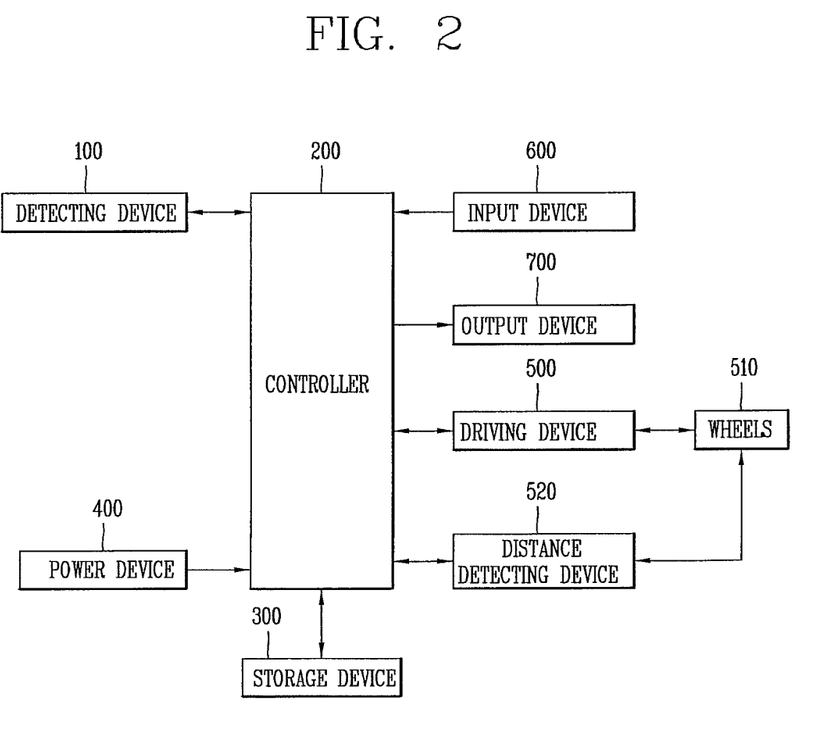

Referring to FIGS. 2 and 3, a robot cleaner according to another embodiment as broadly described herein may be configured to perform a cleaning operation by dividing an entire region into one or more sectors. The robot cleaner may include one or more detecting devices 100, a power device 400, a driving device 500, an input device 600, a controller 200, a storage device 300 and an output device 700. The one or more detecting devices 100 are configured to detect objects inside the sectors, and to output detection data. The power device 400 is provided with a chargeable power supply means, and is configured to supply power to the robot cleaner. The driving device 500 is configured to move the robot cleaner by driving wheels 510. The input device 600 is provided with one or more buttons, and is configured to directly input a control command. The controller 200 is configured to create a partial map with respect to each sector based on detection data, and to create an entire map with respect to an entire region based on a relative position between the sectors. The storage device 300 is configured to store one or more of entire region information, sector information and/or object information. The output device 700 is configured to output at least one of object information, position information of the robot cleaner, information on a cleaning region including a plurality of sectors, partial map information and/or entire map information.

The power device 400 is configured to supply power to the robot cleaner so that the robot cleaner can move to perform a cleaning operation. If a current amount of a battery provided in the power device 400 is deficient, a charging current is supplied from a charging plate.

The driving device 500 moves the robot cleaner by driving a wheel motor for rotating a plurality of main wheels and one or more supplementary wheels. The robot cleaner may further comprise a distance detecting device 520 connected to the wheels 510 and configured to detect a moving distance of the robot cleaner.

A user directly inputs a control command to the robot cleaner through the input device 600. And, the user may input, through the input device 600, a command for outputting the information stored in the storage device 300, such as object information, region information, sector information, partial map information, topological map information and/or entire map information. The input device 600 may be provided with at least one of an OK button, a set button, a reset button, a deletion button, a cleaning start button or a stop button. For instance, the OK button is used to input a command for certifying a position of an object (obstacle), a position of the robot cleaner, a cleaning region, a plurality of sectors, a partial map, a topological map, an entire map, etc. And, the set button is used to input a setting command.

The storage device 300 is configured to store therein detection data sensed when the robot cleaner is currently moving, when the robot cleaner has been previously moved, and when the robot cleaner performs a cleaning operation. The storage device 300 is implemented as a non-volatile memory. The non-volatile memory (NVM, NVRAM) is a storage device for keeping stored information even if power is not supplied thereto. The non-volatile memory includes ROM, a flash memory, a magnetic computer memory device (e.g., a hard disc, a diskette drive and a magnetic tape), an optical disc drive, etc. The storage device 300 is configured to store therein extracted feature lines, a created partial map, a topological map, an entire map, etc. Alternatively, the storage device 300 may store therein moving records of the robot cleaner within a cleaning region. Still further, the storage device 300 may store therein an entire region and a plurality of sectors.

The output device 700 is configured to output information stored in the storage device 300. The output device 700 may further output a current state of each device of the robot cleaner, a current cleaning state, etc. The output device 700 may be implemented as one of a light emitting diode (LED), a liquid crystal display (LCD), a plasma display panel (PDP), and an organic light emitting diode (OLED). Here, the input device 600 and the output device 700 may be implemented in the form of a touch screen for allowing a user to perform input and output.

The robot cleaner may further comprise a cleaning device (not shown). The cleaning device is provided with a suction motor for sucking air, and means for collecting dusts, thereby sucking dusts or foreign materials.

Figure 4:
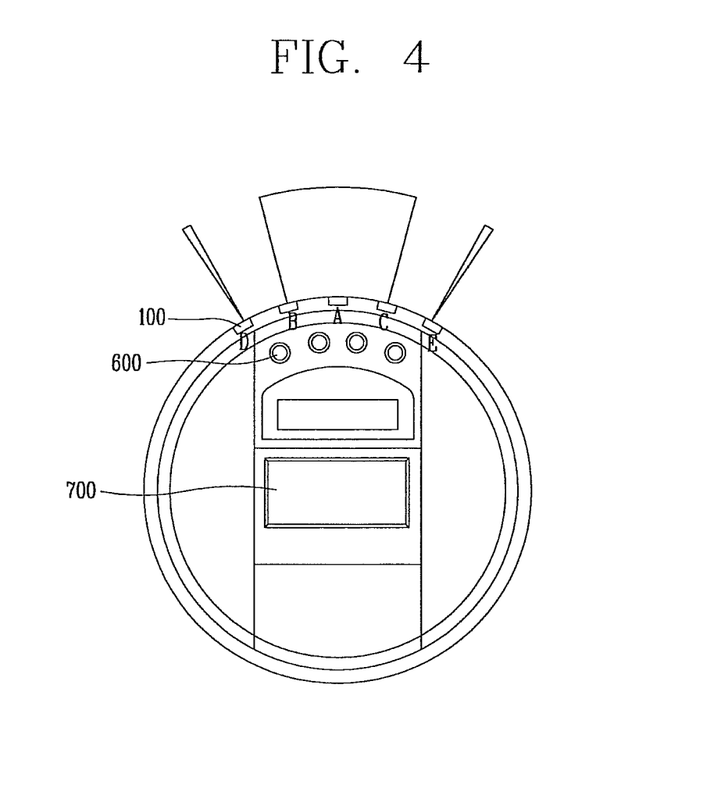
FIG. 4 illustrates detection of an object by the robot cleaner shown in FIG. 3.

Referring to FIG. 4, the detecting device 100 includes a plurality of sensors, A, B, C, D and E. Here, 'A' indicates a position sensitive detector (PSD) sensor, 'B' and 'C' indicate transmitting sides of a supersonic sensor, and 'D' and 'E' indicate receiving sides of the supersonic sensor. In certain embodiments, a detection distance of the PSD sensor A and the supersonic sensor B-E may be approximately 30 cm. In FIG. 4, the robot cleaner adopts the PSD sensor A and the supersonic sensor B-E as the detecting device 100. However, the robot cleaner may adopt other types of distance sensors, e.g., an infrared ray sensor. The number and positions of the sensors of the detecting device 100 may be variable. The robot cleaner may detect a position of an object (obstacle) by using one of the PSD sensor A and/or the supersonic sensor B-E or by using both of them, thereby recognizing a self position relative to the object (obstacle).

Figure 5:
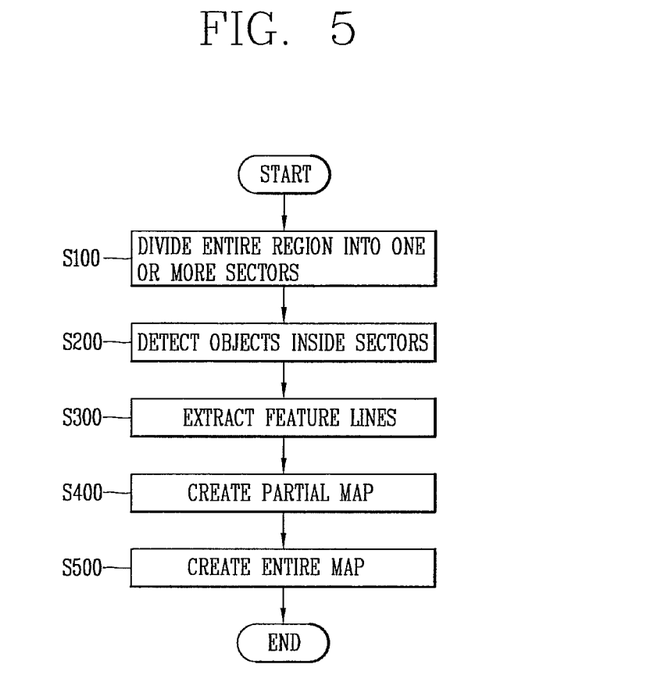
FIGS. 5 to 8 are flowcharts of a method for controlling a robot cleaner as embodied and broadly described herein.

Referring to FIG. 5, a method for controlling a robot cleaner according to one embodiment as broadly described herein may include dividing an entire region into a plurality of sectors (S100), detecting objects inside the sectors (S200), extracting one or more feature lines based on a result of the detection (S300), creating a partial map with respect to each of the sectors using the feature lines (S400), and creating an entire map with respect to the entire region based on a position relation between the partial maps (S500).

The robot cleaner divides the entire region into one or more rectangular regions (sectors) so as to prevent position errors from being accumulated (S100), and sequentially cleans each sector. Here, the robot cleaner initializes a partial map to be created with respect to each sector, and the detecting device 100 detects an object (obstacle) while running or cleaning along an outer peripheral surface of each sector (S200). The robot cleaner extracts feature lines based on detection data (S300). Here, each feature line includes a plurality of feature points. Then, the robot cleaner performs filtering with respect to the feature lines. The robot cleaner creates a partial map with respect to each sector by using, for example, Rao-Blackwellised Particle Filtering (RBPF) and a position recognition and mapping algorithm, such as, for example, Simultaneous Localization And Mapping (SLAM) (S400). The robot cleaner compensates for an orientation of each sector in an assumption that feature lines in a home environment are perpendicular to each other.

Figure 6:
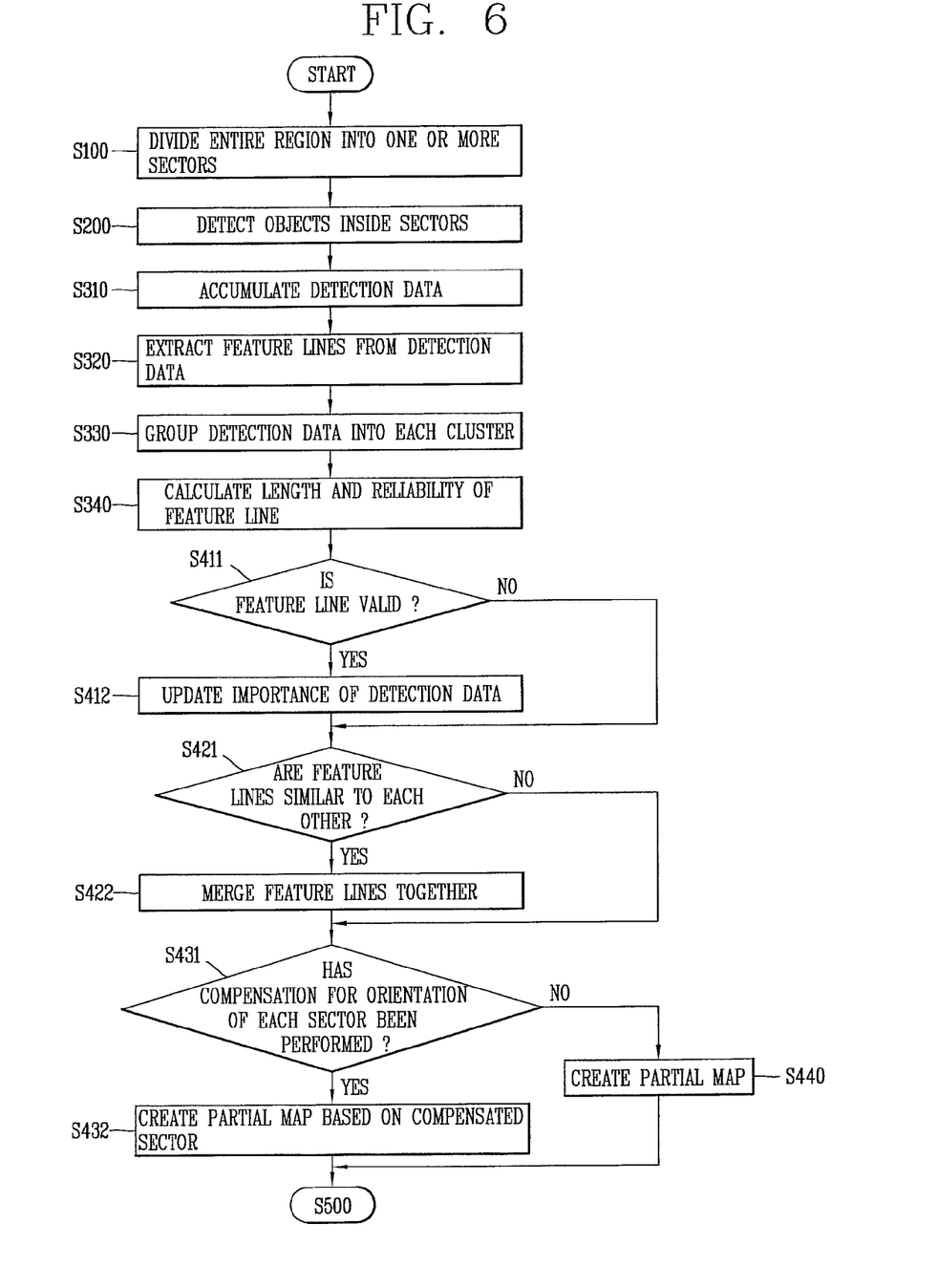

Referring to FIG. 6, the step of creating a partial map (S400) includes compensating for an orientation of each sector by using the feature lines (S431), and creating a partial map based on the compensated sector (S432).

Figure 8:
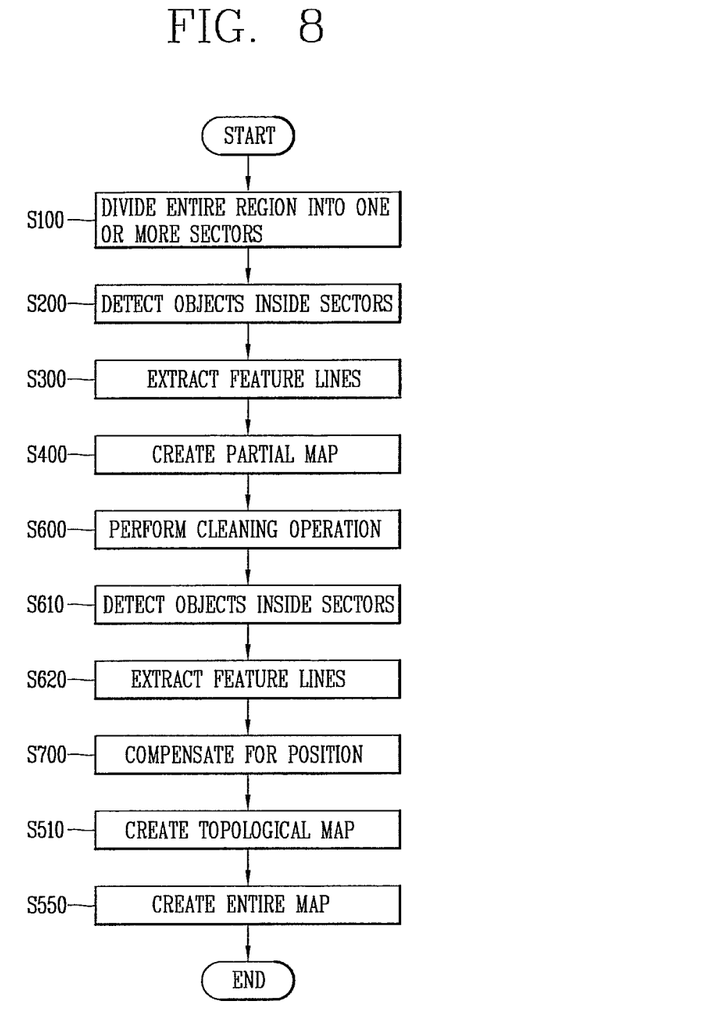

Referring to FIG. 8, the robot cleaner detects an object (S610) while cleaning each sector (S600), thereby extracting feature lines (S620). The robot cleaner compensates for a self position by using currently extracted feature lines and a previously created partial map (S700). The robot cleaner connects neighboring partial maps with each other in the form of a topological map. And, the robot cleaner defines each node of the topological map as a partial map (sector), and an each edge as a position relation between two partial maps (position relation between sectors), thereby creating an entire map based on a topological relation (S500). In case of re-entering a previously-cleaned sector or a sector on a previously-created partial map, the robot cleaner determines whether a closed loop has been formed. Then, the robot cleaner compensates for the topological map according to a result of the determination, thereby creating an entire map (S500).

Figure 9:
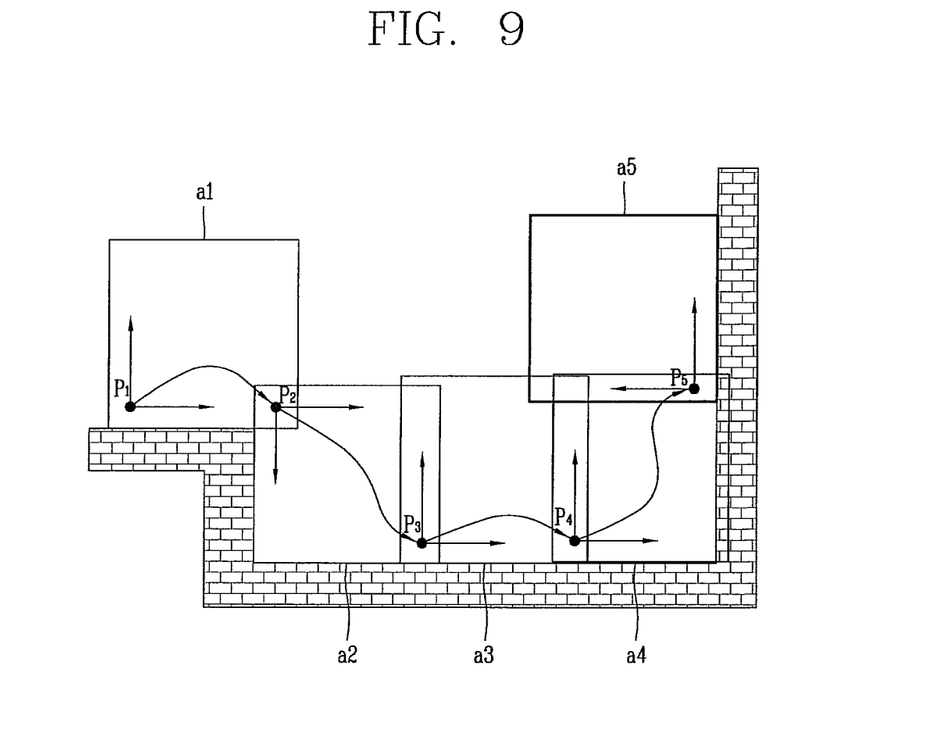
FIG. 9 illustrates an operation to divide an entire region into one or more sectors.

Referring to FIG. 9, the robot cleaner divides an entire region into a plurality of sectors having a predetermined size, and cleans each sector. An origin point of each sector $P_1$-$P_5$ indicates a position of the robot cleaner at the time of initializing each sector, and an X-axis direction of a local coordinate system indicates a direction of the robot cleaner at a corresponding point in time. The robot cleaner cleans a sector, and then approaches a wall surface to move to a starting point of the next sector. The robot cleaner initializes a new sector upon detection of a new area. More particularly, the robot cleaner registers a new sector as a node of a topological map, and sets a relative position between an origin point of a previous sector and an origin point of a current sector as an edge, and sets a covariance of a self position corresponding to a point in time when creating a new sector as a covariance of an edge. In FIG. 9, each pair of arrows that are perpendicular to each other correspond to a respective coordinate system of a partial map, a1~a4 indicate a range of a partial map, and a5 indicates a range of an added partial map.

Referring to FIGS. 5 and 6, the step of extracting feature lines (S300) includes accumulating detection data (S310), extracting feature lines from the detection data (S320), grouping the detection data into a cluster of the feature lines (S330), and calculating a length of the feature line and reliability from the cluster (S340).

The robot cleaner is provided with a relatively small number of inexpensive detecting devices. Therefore, the amount of detection data which can be detected at one time may be somewhat limited. This may cause desired feature lines not to be directly and precisely extracted. Accordingly, as shown in FIG. 10, upon accumulation of a predetermined amount of detection data detected at a plurality of time points (S310), the robot cleaner extracts feature lines (S320). In this instance, the robot cleaner sets a self position corresponding to an intermediate time point as a center point of the feature line. Then, the robot cleaner converts all detection data into coordinates values based on the center point, thereby displaying the converted detection data on a local coordinates system as shown in FIG. 11. And, the robot cleaner converts the data into polar coordinate values, aligns the values so as to have angles, and groups the data into an appropriate cluster by using distances (S330). The robot cleaner may extract parameters from each cluster including, for example, a length of a feature line, an error, etc. Based on these parameters, the robot cleaner calculates a reliability of the feature line (S340). In FIGS. 10 and 11, 'b' indicates a position of the robot cleaner, 'c' indicates a position of a detected object, 'd' indicates a center position of an extracted feature line, and 'e1' and 'e2' indicate feature lines.

Referring to FIGS. 5 and 6, the step of creating a partial map (S400) includes determining validity of a feature line extracted from detection data with respect to an object detected while moving along an outer peripheral surface of each sector (S411), and updating importance of the detection data if the feature line is valid (S412).

The step of creating a partial map (S400) further includes determining whether the feature line extracted from the detection data is similar to a previously-extracted feature line (S421), and merging the two feature lines together if they are similar to each other as a result of the determination (S422).

In the step of creating a partial map (S400), an orientation of each sector may be compensated. A compensation amount may be calculated based on an assumption that the feature lines are perpendicular to each other. Based on the compensated amount, the orientation of the sector is compensated, or adjusted.

Referring to FIG. 12, the robot cleaner initializes positions of all feature points at a starting position of each sector, and samples the positions of the feature points while running or cleaning an outer peripheral surface of the sector. Here, the position of the feature point (b) may be a position of the robot cleaner or a position of a detected object. Hereinafter, it is assumed that the position of the feature point (b) is a position of the robot cleaner corresponding to a time point when detecting an object. In the same manner as in (S300), the robot cleaner maps a newly-extracted feature line with a previously-extracted feature line, and determines whether the newly-extracted feature line is similar to a previously-extracted feature line (S421). If it is determined that the newly-extracted feature line is similar to the previously-extracted feature line, the two feature lines are merged together (S422). And, the robot cleaner determines whether the newly-extracted feature line exists in feature lines on a previously-created partial map. Based on a probability of the existence, the robot cleaner updates importance of feature points of the feature lines (S411). Then, the robot cleaner samples the feature points again according to the updated importance (S412). The robot cleaner repeats these processes until the initially-extracted feature lines are extracted again. Substantially, the positions of the feature points are gradually changed as the robot cleaner moves. This may cause different feature lines to be extracted. Feature points which constitute a feature line best matching with the previously-extracted feature line are set to have highest importance. Based on these feature points, feature lines are extracted and a partial map is created. And, the robot cleaner compensates for its position based on the feature points having highest importance. In FIG. 12, 'b' indicates positions of features points, 'f' indicates a moving path, 'g' indicates a Gaussian boundary with respect to the positions of the feature points, and 'h' indicates features lines.

Referring to FIG. 8, the method further comprises compensating for a position of the robot cleaner based on a result of the detection and the feature lines (S700). In (S700), it is determined whether a feature line extracted from detection data with respect to an object detected while moving along an outer peripheral surface of each sector is valid or not. If it is determined that the feature line is valid, importance of the detection data is updated. Then, a position of the robot cleaner is compensated based on the updated detection data. The robot cleaner compensates for a partial map based on an assumption that a wall surface is perpendicular to the ground, and then cleans inside of each sector. The robot cleaner may substantially constantly compensate for a self position. The robot cleaner samples positions of feature points, and determines whether the newly-extracted feature line exists in feature lines on a previously-created partial map. Based on a probability of the existence, the robot cleaner updates importance of the feature points which constitute the feature lines. Then, the robot cleaner samples the feature points again according to the updated importance. Feature points of a feature line best matching with the previously-extracted feature line are set to have highest importance. And, the robot cleaner compensates for a self position based on the feature points having highest importance. As shown in FIG. 17, when position compensation is not performed, position errors of the robot cleaner may be accumulated. The robot cleaner performs the above processes, thereby precisely recognizing a self position. In FIG. 17, 'h' indicates feature lines, 'e' indicates a moving path sensed by a sensor, 'f' indicates a moving path obtained through the operations, and 'i' indicates a range of a current sector.

Referring to FIGS. 13 to 16, the robot cleaner creates a partial map, and calculates a compensation amount of a sector assuming that main feature lines in a home environment are perpendicular to each other. Based on the calculated compensation amount, the robot cleaner compensates for an orientation of each sector. The robot cleaner selects feature lines each having a reliability more than a predetermined value, and calculates a minimum compensation amount for making the feature lines perpendicular to each other or parallel with each other. The robot cleaner groups feature lines having a similar compensation amount. The robot cleaner multiplies predetermined values to the reliabilities and adds the obtained values to each other, thereby determining a compensation amount with respect to each group which consists of the feature lines.

Then, the robot cleaner calculates a reliability with respect to compensation for each group based on the number of feature lines included in each group and a compensation amount of a counter group. Here, the robot cleaner sets a compensation amount of a group having a highest reliability as a compensation amount of a sector. When the reliability is more than a predetermined value, the robot cleaner compensates for an orientation of each sector (refer to FIGS. 13 and 14), and compensates for previous sectors (refer to FIGS. 15 and 16). Here, 'a' indicates a sector, 'x' indicates a coordinates system, and 'e' indicates a feature line.

Figure 7:
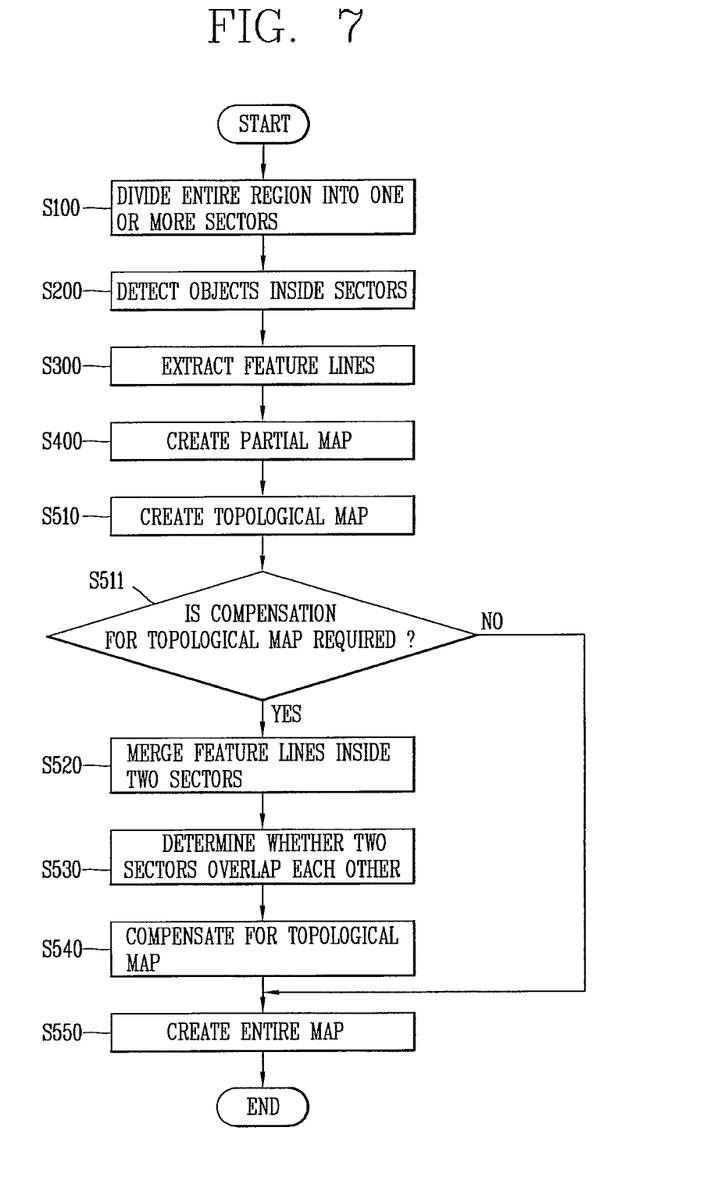

Referring to FIG. 7, the step of creating an entire map (S500) includes creating a topological map based on a position of each partial map and a position relation between two partial maps (S510). In the step of creating an entire map (S500), an entire map is created by using the topological map.

The step of creating an entire map (S500) further includes merging feature lines inside two sectors (S520), determining whether the two sectors are overlapped with each other based on a result of the merging (S530), and compensating for a topological map based on an error between the two sectors overlapped with each other (S540). In the step of creating an entire map (S500), an entire map is created by using the compensated topological map.

Figure 18:
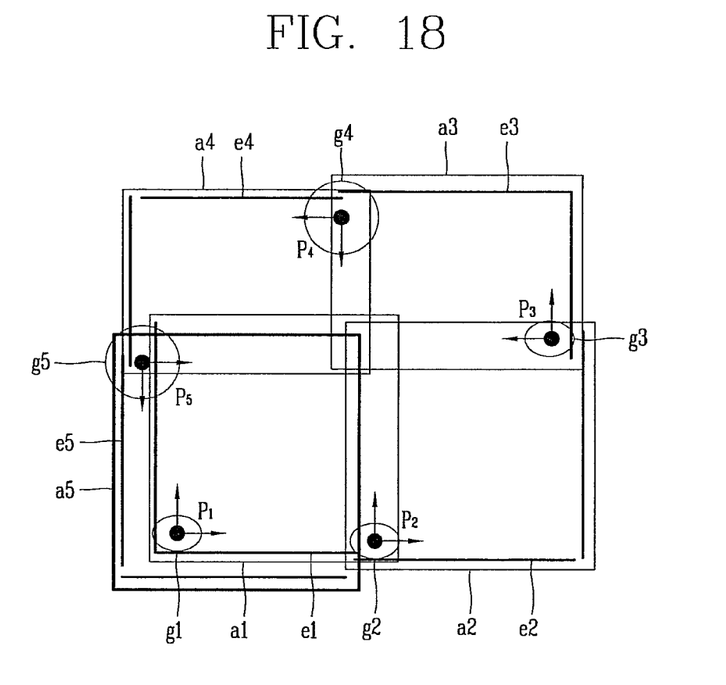
FIGS. 18 to 20 illustrate an operation to create an entire map.
Figure 19:
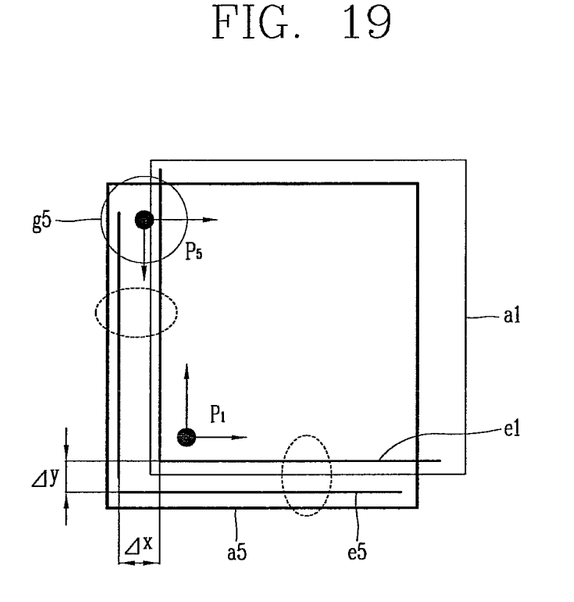

Referring to FIGS. 18 and 19, the robot cleaner selects, from previously-cleaned sectors, a sector that most overlaps with a current sector. Then, the robot cleaner compares features lines of the current sector and the selected sector with each other and calculates a position error based on the identical feature lines. Sectors may have a position error therebetween. The more the robot cleaner runs or cleans, the more increased the position error is. Accordingly, when determining whether two sectors overlap with each other, the two sectors are extended to be compared taking into each other with consideration of the position error therebetween. The robot cleaner considers a position error between two sectors even when comparing feature lines with each other. If it is determined that feature lines of two selected sectors are not identical to each other, the robot cleaner selects a sector that second most overlaps with a current sector and compares feature lines of the current sector and the selected sector with each other. If it is determined that the feature lines are identical to each other, the two sectors are determined to overlap each other. Then, a position error of the current sector is calculated by using the identical feature lines. Here, 'a' indicates a range of a sector, 'g' indicates a Gaussian boundary, 'P' indicates a position of the robot cleaner, and 'e' indicates a feature line.

Figure 20:
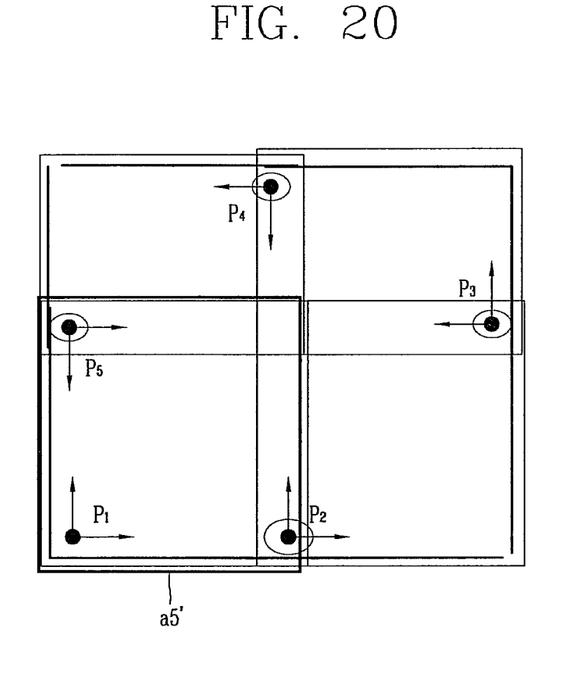

Referring to FIG. 20, when two sectors are determined to overlap each other, i.e., when a closed loop is detected, the robot cleaner compensates for a topological map so that a position error between the two sectors that overlap other can be reduced. Then, based on the compensated topological map, the robot cleaner creates an entire map. When compensating for the topological map, the robot cleaner may use an algorithm such as mahalanobis distance minimization. When creating the entire map, the robot cleaner may merge neighboring feature lines recognized to be identical to each other. In FIG. 20, P indicates a feature point, i.e., a position of the robot cleaner, and a5' indicates a sector obtained after compensating for the topological map.

As aforementioned, in a robot cleaner and a controlling method as embodied and broadly described herein, an entire region may be divided into a plurality of sectors based on detection data sensed by an expensive detecting device, and a partial map with respect to each sector may be created.

Furthermore, an entire map with respect to an entire region may be created based on a position of a partial map with respect to each sector, and a topological relation between the partial maps. Based on the entire map, the robot cleaner may recognize a self position. This may allow the entire region to be completely cleaned, and allow the robot cleaner to be rapidly moved to non-cleaned regions.

A robot cleaner is provided that is capable of dividing an entire region into a plurality of sectors based on detection data obtained by detecting an obstacle using an inexpensive sensor, capable of creating a partial map with respect to each of the sectors, and capable of performing a cleaning operation based on the partial map, and a controlling method of the same.

A robot cleaner is provided that is capable of creating a partial map based on detection data sensed by an in-expensive sensor, compensating for a moving direction and recognizing a self position, and a controlling method of the same.

A robot cleaner is provided that is capable of creating an entire map with respect to an entire region based on a position relation between partial maps, and capable of recognizing a self position, and a controlling method of the same.

A robot cleaner as embodied and broadly described herein may perform a cleaning operation by dividing an entire region into one or more sectors, such robot cleaner including one or more detecting units configured to detect objects inside the sectors and configured to output detection data; and a controlling unit configured to create a partial map with respect to each of the sectors based on the detection data, and configured to create an entire map with respect to the entire region based on a position relation between the sectors.

A method of controlling a robot cleaner as embodied and broadly described herein may include dividing an entire region into a plurality of sectors; detecting objects inside the sectors; creating a partial map with respect to each of the sectors based on a result of the detection; and creating an entire map with respect to the entire region based on a position relation between the partial maps.

A robot cleaner and associated control method as embodied and broadly described herein may include a storage medium having an algorithm therein, the algorithm dividing an entire region into a plurality of sectors, detecting objects inside the sectors, extracting one or more feature lines based on a result of the detection, creating a partial map with respect to each of the sectors by using the feature lines, and creating an entire map with respect to the entire region based on a position relation between the partial maps.

In a robot cleaner and associated control method as embodied and broadly described herein, an entire region may be divided into a plurality of sectors based on detection data obtained by detecting objects with using an inexpensive sensor, and a partial map with respect to each sector may be created.

In a robot cleaner and associated control method as embodied and broadly described herein, the robot cleaner may be fabricated at low cost, and may perform a complete cleaning operation based on the partial maps.

In a robot cleaner and associated control method as embodied and broadly described herein, based on detection data sensed by an inexpensive sensor, partial maps may be created, a moving direction may be compensated and a position of the robot cleaner may be recognized. This may reduce the number of non-cleaned regions to enhance cleaning efficiency, and may enhance stability of the system.

In a robot cleaner and associated control method as embodied and broadly described herein, an entire map with respect to an entire region may be created based on a position relation between partial maps with respect to a plurality of sectors, and a position of the robot cleaner may be recognized based on the entire map. This may allow the entire region to be completely cleaned, and allow the robot cleaner to be easily moved to non-cleaned regions. This may enhance cleaning efficiency, and enhance a user's convenience and stability of the system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner that divides a full region into a plurality of sectors to perform a cleaning operation, the robot cleaner comprising:
   one or more detecting devices configured to detect objects within the plurality of sectors and configured to output corresponding detection data; and
   a controller configured to generate a partial map for each of the a plurality of sectors based on the detection data, and configured to generate a full map corresponding to the full region based on a relative position of the plurality of sectors, wherein the controller comprises:
      a feature line extracting module configured to extract one or more feature lines for each of the plurality of sectors based on the detection data;
      a partial map generating module configured to generate a partial map for each of the plurality of sectors based on the one or more feature lines; and
      a full map generating module configured to generate a topological map indicating a position of each of the plurality of sectors and a relative position between the plurality of sectors, and configured to generate the full map based on the topological map, wherein the full map generating module matches feature lines respectively corresponding to two separate sectors, and determines whether the two separate sectors overlap each other based on a level of matching of the feature lines.

2. The robot cleaner of claim 1, wherein the partial map generating module compensates for an orientation direction of a corresponding sector based on the one or more feature lines, and generates the partial map based on the compensated sector.

3. The robot cleaner of claim 1, wherein the controller further comprises a position recognizing module configured to recognize a position of each of the plurality of sectors based on the detection data and the one or more feature lines.

4. The robot cleaner of claim 1, wherein the full map generating module compensates for the topological map based on a position error between the two overlapping sectors, and generates the full map based on the compensated topological map.

5. A method of controlling a robot cleaner, the method comprising:
   dividing a cleaning region into a plurality of sectors;
   detecting objects within each of the plurality of sectors;
   extracting one or more feature lines based on the detection of objects within each of the plurality of sectors;
   generating a partial map for each of the plurality of sectors using the one or more feature lines; and
   generating a full map of the cleaning region based on a relative position of the partial maps corresponding to the plurality of sectors,
   wherein extracting one or more feature lines comprises:
      accumulating detection data;
      extracting a plurality of feature points from the detection data;
      grouping the plurality of feature points into respective clusters to form feature lines; and
      calculating a length and a reliability of the feature lines of each of the clusters.

6. The method of claim 5, wherein generating a partial map further comprises:
   compensating for an orientation of each of the plurality of sectors using the respective one or more feature lines; and
   generating a partial map for each of the plurality of sectors based on the compensation.

7. The method of claim 5, wherein generating a partial map includes:
   determining validity of a corresponding one of the one or more feature lines extracted from detection data based on an object detected while moving along an outer peripheral surface of each sector; and
   updating an importance level of the detection data if it is determined that the feature line is valid.

8. The method of claim 7, wherein generating a partial map further comprises:
   determining whether a current feature line extracted from the detection data is similar to a previously-extracted feature line; and
   merging the current and previously-extracted feature lines together if it is determined that they are similar to each other.

9. The method of claim 6, wherein compensating for an orientation of each of the plurality of sectors comprises calculating a compensation amount assuming feature lines of the sector are substantially perpendicular to each other, and adjusting the orientation of the sector based on the calculated compensation amount.

10. The method of claim 5, further comprising compensating for a position of each of the plurality of sectors based on the respective detection of objects within each of the plurality of sectors and the one or more feature lines respectively corresponding to each of the plurality of sectors.

11. The method of claim 10, wherein compensating for a position comprises:
    determining whether a feature line extracted from detection data collected corresponding to an object detected while moving along an outer peripheral surface of a sector is valid;
    updating an importance of the detection data if it is determined that the feature line is valid; and
    compensating for a position based on the updated importance of the detection data.

12. The method of claim 5, wherein generating a full map comprises:
    generating a topological map based on a position of each of the partial maps and relative positions between adjacent partial maps; and
    generating the full map based on the topological map.

13. The method of claim 12, wherein generating the full map further comprises:
    merging feature lines within two sectors;
    determining whether the two sectors overlap each other based on a result of the merging; and
    adjusting the topological map based on a position error between the two sectors that overlap each other.

14. A non-transitory storage medium including an algorithm provided therein, the algorithm comprising:
    dividing a full region into a plurality of sectors;
    detecting objects within each of the plurality of sectors from data captured by a detector mounted on a cleaner;
    extracting one or more feature lines based on the detection of objects within the plurality of sectors;
    generating a partial map for each of the plurality of sectors using the one or more feature lines; and
    generating a full map of the full region based on a relative position of the partial maps, wherein extracting one or more feature lines comprises:
       accumulating detection data;
       extracting a plurality of feature points from the detection data;
       grouping the plurality of feature points into respective clusters to form feature lines; and
       calculating a length and a reliability of the feature lines of each of the clusters.

15. The algorithm of claim 14, further comprising generating a topological map based on a position of each partial map and a relative position between the partial maps.

* * * * *